United States Patent
Biggerstaff

(10) Patent No.: US 8,225,277 B2
(45) Date of Patent: Jul. 17, 2012

(54) NON-LOCALIZED CONSTRAINTS FOR AUTOMATED PROGRAM GENERATION

(75) Inventor: Ted James Biggerstaff, Austin, TX (US)

(73) Assignee: Ted J. Biggerstaff, Austin, TX (US)

( * ) Notice: Subject to any disclaimer, the term of this patent is extended or adjusted under 35 U.S.C. 154(b) by 149 days.

(21) Appl. No.: 12/766,894

(22) Filed: Apr. 25, 2010

(65) Prior Publication Data

US 2010/0205589 A1   Aug. 12, 2010

Related U.S. Application Data

(63) Continuation-in-part of application No. 12/363,738, filed on Jan. 31, 2009, now Pat. No. 8,060,857.

(51) Int. Cl.
*G06F 9/44* (2006.01)
*G06F 9/45* (2006.01)

(52) U.S. Cl. .................. 717/106; 717/114; 717/136

(58) Field of Classification Search .............. 717/106
See application file for complete search history.

(56) References Cited

U.S. PATENT DOCUMENTS

| | | | |
|---|---|---|---|
| 6,425,119 B1 * | 7/2002 | Jones et al. | 717/100 |
| 6,684,388 B1 * | 1/2004 | Gupta et al. | 717/136 |
| 7,581,170 B2 * | 8/2009 | Baumgartner et al. | 715/234 |
| 2007/0168929 A1 * | 7/2007 | Larvet et al. | 717/104 |
| 2010/0218164 A1 * | 8/2010 | Hsueh et al. | 717/104 |

OTHER PUBLICATIONS

Neighbors, "The Draco Approach to Constructing Software from Reusable Components" 1984, IEEE Transactions on Software Engineering, vol. SE-10, No. 5, pp. 564-574.*
Bezivin et al., "Model Transformations? Transformation Models!" 2006, Springer-Verlag, Model Driven Engineering Languages and Systems (MoDELS), LNCS 4199, pp. 440-453.*
Biggerstaff, "A Perspective of Generative Reuse" 1997, Microsoft, Technical Report MSR-TR-97-26.*

* cited by examiner

*Primary Examiner* — James D Rutten

(57) ABSTRACT

A method and a system for non-locally constraining a plurality of related but separated program entities (e.g., a loop operation and a related accumulation operation within the loop's scope) such that any broad program transformation affecting both will have the machinery to assure that the changes to both entities will preserve the invariant properties of and dependencies among them. For example, if a program transform alters one entity (e.g., re-expresses an accumulation operation as a vector operation incorporating some or all of the loop's iteration) the constraint will provide the machinery to assure a compensating alteration of the other entities (e.g., the loop operation is reduced to reflect the vectorization of the accumulation operation). One realization of this method comprises specialized instances of the related entities that while retaining their roles as program entities (i.e., operators), also contain data and machinery to define the non-local constraint relationship.

16 Claims, 11 Drawing Sheets

Phases in Order of Occurrence

- Partitioning and Loop Localization
- Inlining of IL Definitions
- Loop Simplification

Interrelated Operations

- Formulate image loops for Convolve.
- Formulate neighborhood loops and couple their reduction and map operators (e.g., forall and times) to preserve non-local constraint relationship.

- Inline Convstep definition, which triggers ILP feature encapsulation:
  - Specialization of neighborhood (e.g., sp specialized to $sp_{ILP}$) to reflect ILP,
  - Creation of name of array (e.g., dsarray9) for weights,
  - Revision of Convstep definition and (W sp ...) definition to use newly created array for weights (e.g., dsarray9) and
  - Construction of code to populate newly created array.

- Inline new definition of (w $sp_{ILP}$ ...), which triggers creation of a weights array (e.g., dsarray9), its gpl declaration and the execution of code to populate the array with weight values.

- Re-express coupled form of neighborhood loops using ILP instructions.

Fig. 1

CASE 1:
If <u>Pre Block</u> and <u>Post Block</u> are nil and ILPLoop (forall$_{IPL}$ ...) succeeds, then revise forall$_{ilp}$ definition to generate {ans = ILP(forall$_{IPL}$ ...) ; }

CASE 2:
If <u>Pre Block</u> or <u>Post Block</u> is not nil and ILPLoop (forall$_{IPL}$ ...) succeeds and no data dependency between <u>Pre Block</u> and += expr, then revise forall$_{ilp}$ definition to generate {ans = ILPLoop (forall$_{IPL}$ ...) ; } plus for blocks for <u>Pre Block</u> and <u>Post Block</u>

CASE 3:
If <u>Pre Block</u> or <u>Post Block</u> is not nil and ILPLoop (forall$_{IPL}$ ...) succeeds and there IS a data dependency between <u>Pre Block</u> and ILPLoop (forall$_{IPL}$ ...), then no change to forall$_{ilp}$ definition.

CASE 4:
If <u>Pre Block</u> or <u>Post Block</u> is not nil and ILPLoop (forall$_{IPL}$ ...) fails, then no change to forall$_{ilp}$ definition.

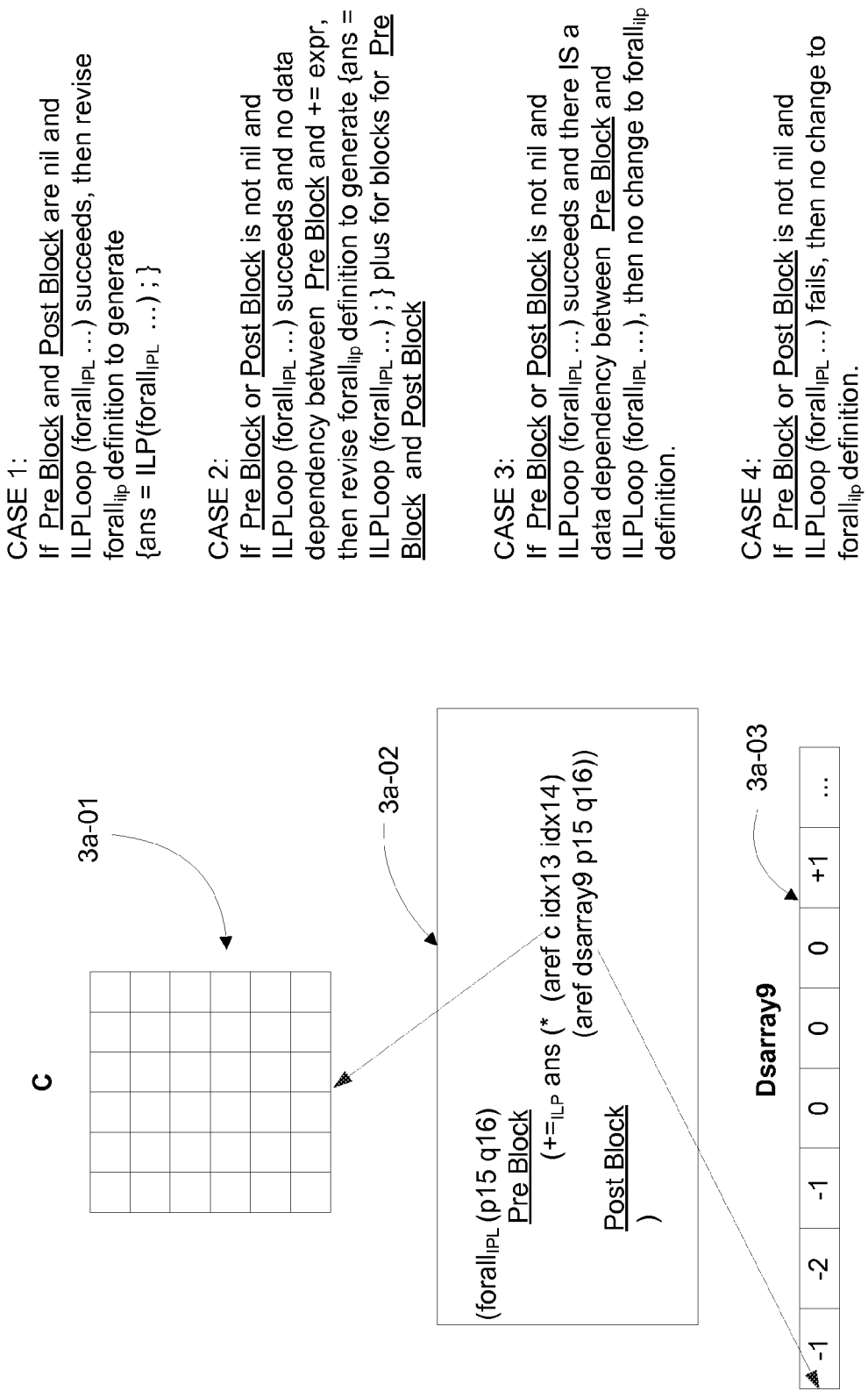

Fig. 3a

```
(AbsDesign convolutionAD
 (signature (convolution (aref ?s:image ?i:iterator ?j:iterator) (aref ?s:template ?p:iterator ?q:iterator))))
 (super imageconvolutions)  :: super class of this abstract design class
 (context                    :: Relate domain objects to ?variables that will bind to target program fragments
  (Image ?a)                 :: image of the convolution loop
  (Template ?s)              :: neighborhood of the convolution loop
  (ImageIndex1 ?i)           :: row index of image loop
  (ImageIndex2 ?j)           :: column index of image loop
  (PIndex ?p)                :: row index of neighborhood loop
  (PIndexLow ?plow)          :: start row index of neighborhood loop
  (PIndexHigh ?phigh)        :: end row index of neighborhood loop
  (QIndex ?q)                :: column index of neighborhood loop
  (QIndexLow ?qlow)          :: start column index of neighborhood loop
  (QIndexHigh ?qhigh)        :: end column index of neighborhood loop
  (CurrPixel (aref ?a:image ?i:iterator ?j:iterator))        :: Current pixel expression
  (Weight    (w ?s:template (aref ?a:image ?i:iterator ?j:iterator))) ::Weight of current pixel at current template offset
              (aref ?s:template ?p:iterator ?q:iterator))))

:: Intermediate Language Method Signatures
 (row ?s:template (aref ?a:image ?i:iterator ?j:iterator) ?p:iterator ?q:iterator) :: row idx from template offset
 (col ?s:template (aref ?a:image ?i:iterator ?j:iterator) ?p:iterator ?q:iterator) :: col idx from template offset
 (w ?s:template (aref ?a:image ?i:iterator ?j:iterator) (aref ?s:template ?p:iterator ?q:iterator)) :: pix weight
 (partestx  ?s:template)     :: partitioning condition
  . . .
 ))
```

Fig. 5a

NON-LOCALIZED CONSTRAINTS FOR AUTOMATED PROGRAM GENERATION

CROSS-REFERENCE TO RELATED APPLICATIONS

This invention is a continuation in part of patent application Ser. No. 12/363,738, titled "Automated Partitioning of a Computation for Parallel or Other High Capability Architecture," Ted J. Biggerstaff, Jan. 31, 2009, now U.S. Pat. No. 8,060,857.

Patent application Ser. No. 12/363,738, Titled "Automated Partitioning of a Computation for Parallel or Other High Capability Architecture," Ted J. Biggerstaff, Jan. 31, 2009.

Patent application Ser. No. 12/766,894, Titled "Non-Localized Constraints for Automated Program Generation," Ted J. Biggerstaff, Apr. 25, 2010.

FEDERALLY SPONSORED RESEARCH

Not Applicable

SEQUENCE LISTING OR PROGRAM

Not Applicable

BACKGROUND

1. Field of Invention

This invention relates to the automatic generation of programs where the automated generation systems are faced with the problem of creating and refining separated but constraint related parts of the program, where the separation of the parts may occur in both the time and space domain or just one of the two, where those parts are related by one or more non-local constraints (i.e., constraints that include all of the separated parts but perforce must span the separation gaps) such that those non-local constraints require that generator-based refinements or alterations of one of the constrained parts will determine and effect compensating generator-based refinements or alterations to the related parts so as to preserve the invariant properties of the overall constraint relationship and thereby preserve a consistent set of interdependencies among the parts, where such automatic generation systems provide various kinds of facilities for refining execution platform neutral specifications of computations into computer programs expressed in conventional programming languages such as, C, C++, Java and similar languages often referred to by the term General Programming Languages (or GPLs), and where such automatically generated computer programs are frequently required to exploit high capability facilities of such execution platforms including but not limited to fine grain, middle grain and large grain parallelism facilities, distributed facilities, security facilities, mobile facilities, remote services facilities, associated processing services facilities, situational facilities (e.g., awareness, position, movement, response, and so forth), quantum computing facilities and other or future high capability facilities.

2. Description of Prior Art

Adds Machinery Consistent with Previous Patent Application

This patent application enhances, supplements and extends the machinery of patent application Ser. No. 12/363,738 by introducing a new mechanism to couple separated elements of the target program being created by some domain specific generator (e.g., DSLGen, the reduction to practice generator of patent application Ser. No. 12/363,738) as well as to couple separated generative transformations that must coordinate their activities across separated generation times and separated target program locales.

Constraint Satisfaction Programming

Constraint satisfaction programming (or CSP) research is a sound-alike topic but it is NOT focused on using constraints to guide the construction and parallelization (or other program reorganization techniques) of general computer programs in the sense considered in this invention. And more specifically, it is not focused on dealing with explicitly coupled constraints on specific objects (i.e., program parts) and explicitly coupled transformations on specific, separated program parts where the constraints, their separated data and the related transformations inhabit a special, common context. In that special, common context, the state of one data item or transformation is inexorably dependent on the state of the others such that the change of any one requires compensating changes to the others.

For more and deeper background on CSP, see the following references:

Barták, R.: "Constraint Programming: In Pursuit of the Holy Grail," in Proceedings of the Week of Doctoral Students (WDS99), Part IV, MatFyzPress, Prague (June 1999)555-564;

Borning, A.: "The Programming Language Aspects of ThingLab, A Constraint-Oriented Simulation Laboratory," in ACM Transactions on Programming Languages and Systems, 3(4) (1981) 252-387;

Apt, Krzysztof: Principles of Constraint Programming, Cambridge University Press, Cambridge, UK (2003); and Schulte, Christian and Stuckey, Peter J.: Efficient Constraint Propagation Engines, ACM Transactions on Programming Languages and Systems, Vol. 31, No. 1, (2009).

CSP, on the other hand, is the process of finding a solution (i.e., a vector of values) for a set of variables that satisfy a set of constraints. It is typically focused on and characterized by computational models that use largely global constraints (dynamically) to guide the execution of a program searching a very large search space for potential solutions to a problem (e.g., finding DNA sub-segments that may be part of a single longer segment based on common sub-segments patterns). Any specific relationship among specific items of data or specific transformations on that data in CSP is purely an indirect consequence of the overall algorithm and global problem constraints. There is no machinery for direct, explicit constraint-based connections or couplings between specific data items, constraints on those specific data items or specific transformations on those specific data items. The idea of CSP is that the constraints can (possibly) reduce the search of an infeasibly large search space to a feasible size by determining that large portions of that space do not contain or are unlikely to contain the solution based on some macro-properties (i.e., global properties) of that large subspace. CSP is mostly focused on constraint satisfaction problems that are best characterized as a "mathematically oriented process akin to solving equations" where the "equations" are the constraints. The problems are mostly combinatorial in nature and the approaches are mostly methods of searching some large solution space for an answer meeting the set of constraints. The constraints are often propagated over the data description as a mechanism of guiding the execution of the search. Typical example problems are:

Simulations of real-world systems,

Finding DNA sequences given a large number of overlapping sub-sequences,

Determining protein structures,

Graphic layout solutions (e.g., projecting a complex network onto a two dimensional surface in a way that makes it easy to understand), Configuring or designing networks such that they meet some set of constraints, Scheduling problems (i.e., scheduling events given a set of restrictions), and Planning problems (akin to scheduling problems).

In contrast to this invention, compensating effects are not directly triggered by remote refinement actions in CSP. In CSP, the problem representation generally comprises two distinct languages, the language that expresses the constraints and the language that defines the data. In the CSP world, the constraint aspect of the problem is formulated as mathematical forms (e.g., logical or equational forms) and that is the conventional way in which most constraint truths are expressed. The form or structure of the data does not imply aspects of the underlying constraint truths. Certainly, the data may have inherent properties that are used but this does not provide that same kind of explicit, operational coupling and connection among individual data items and individual transformations that is manifest in this invention.

In summary, the broad structure of and approach to CSP problems is quite different from that of automatic program generation problems in general and from the constraint-based automatic program generation method using this invention in particular.

Previous Work by This Author

Other automatic program generation solutions also are quite different in structure and mechanism. In previous work by this author (Ted J. Biggerstaff, "A New Architecture for Transformation-Based Generators," IEEE Transactions on Software Engineering, Vol. 20, No. 12, December 2004), transformations were related to data items through property structures associated with said data items, however, the transformations in said work were triggered by simple state information and they did not manifest a bidirectional, operational coupling that would effect the compensating changes necessitated by remote coupling as defined in this invention.

Aspect Oriented Programming

Aspect Oriented Programming (AOP) is another superficially similar but fundamentally different generation technique. (See Tzilla Elrad, Robert E. Filman, Atef Bader, (Eds.), "Special Issue on Aspect-Oriented Programming," Communications of the ACM, vol. 44, no. 10, pp. 28-97, 2001.) AOP seeks to separately specify aspects of the target program in a GPL level language and then as a separate process, weave those separate aspects into a design that is more computationally optimal (but a design that is by necessity less modular). For example, one might specify the essence of a computation separately from a cache-based optimization for that computation. AOP is an optimization oriented approach that does not use the mechanisms of this invention to deal with non-localized constraints and to the best of the authors knowledge, AOP does not deal with non-localized constraints at all. Even if by some stretch of logic, AOP might be said to implicitly handle non-localized constraints, it is certainly not via the machinery used in this invention.

Another difference is that AOP is working largely in the GPL domain and not the problem domain or even in the programming process domain (i.e., the domain that specifies the process of formulating abstract design entities and step by step refining them into concrete program entities). That is to say, the domain abstractions that this invention deals with are not a part of an AOP specification as explicit entities. For example, an implementation free specification of a computation is perforce not in the GPL domain by the very virtue of the fact that it is an implementation independent specification of a computation.

Further, the domain specific entities and relationships used in this invention (e.g., an abstract design pattern) would be difficult to express in an AOP specification because of the AOP bias toward concrete, GPL representations, which impedes the objective of this invention to create provisional, partial design edifices and defer making concrete GPL-level decisions until the broad architectural frameworks have been derived.

Additionally, the process of leveraging domain knowledge to formulate provisional but still incomplete designs in order to decompose the generation process into a series of steps that solve smaller, simpler problems in the course of achieving an overall generation goal, falls outside of the context of AOP. In the context of this invention, determining that instruction level parallelism is possible and desirable is easily made at an early stage of the processing when the computation specification is in a highly domain specific (and abstract) form and when those domain specific forms can suggest the possibility of instruction level parallelism and some of the abstract design details of it. However, the low level details needed to formulate the actual parallel instructions (e.g., an existing and populated coefficient array) have not been developed at this early stage. Later, when those needed low level details do become available, the early preparation work informs the later stages about some of the objectives, entities and constraints that will have to be incorporated into the process that derives the actual low level parallel instructions.

Another key difference is that AOP has no machinery for non-localized constraints connecting and mediating the changes to program entities and to programming process entities separated across the physical program, nor any concept of those same entities connected across generation times (e.g., connecting entities in a design stage with entities in a GPL stage).

OBJECTS AND ADVANTAGES

The objects of this invention are:

Non-localized constraints are signaled and partly established by specialization of related but separated program objects (i.e., operators and/or operands).

Transformations are part of the underlying machinery that derives in a step by step manner the intended computer application implementation from an implementation free specification of the intended computation.

The Intermediate Language (IL) is the abstraction mechanism used to represent elements of the final implementation that have not yet been fully determined or fleshed out by the early phases of the generation process. That is, elements of the IL are temporary stand-ins for the concrete code that cannot be written at the time the IL is generated because the information required to express the IL as concrete code is not yet available. For example, code organizing decisions may not yet have been made, contextual details that determine the details of the concrete code may not yet have been generated, variations in the concrete code details implied by desired design features (e.g., parallel, thread-based decomposition of the computation or re-expression of expressions to exploit instruction level parallelism) may not yet have been introduced into the evolving computation, and other similar impediments.

Method Transformations are the form used to express the Intermediate Language. These forms are method-like operations specific to design objects (e.g., specific to image data structures or neighborhoods within image). When design objects are specialized, their associated IL operations may be specialized by a Higher Order Transformation (HOT) to reflect the introduction of design features in the intended implementation. HOTs are transformations that transform other transformations (where those other transformations are sometimes called first order transformations or low order transformations).

Constraint Coupled programming design objects that are related but separated within the target program Abstract Syntax Tree (AST) such that their refinement into program code is inextricably linked, thereby allowing for changes to one program object to be automatically compensated for by related changes to the others in order to maintain their overall constraint invariant relationship. Using a quantum mechanics metaphor, this concept might be thought of as an analog of "action at a distance" where, for example, measuring the spin of one of a pair of coupled but separated quantum particles instantaneously and inexorably determines the spin of the other particle.

Abstract Design Patterns (ADPs) are a method of partially and provisionally specifying the design of a function or part of a program without fully and finally expressing it in the low level detail of a general programming language (GPL) form. ADPs allow many design features that are to be part of the eventual implementation but not fundamental to the target computation's definition (e.g., those that depend on the structure of the execution platform, or more concretely, those that exploit multicore or vector instructions) to be deferred and separately specified by the application programmer on a platform by platform basis. Then later and as a separate generation process, these design features can be used to customize the target computation for the intended platform.

The advantages are:

No application reprogramming is required to change from one execution platform to a different execution platform. The implementation free specification of the computation does not need to be changed in order to move to a new execution platform and, more importantly, to take full advantage of all optimization opportunities (even new ones) provided by that new platform. Only the execution platform specification needs to be changed by the application programmer, which is a matter of changing a few domain specific descriptors. Of course, the program generation system needs to be updated to accommodate any new execution platforms that become available. While different in kind, this is analogous to providing a new compiler for a new machine. Once the new generation system is provided, the application programmer does not have to reprogram his application to take advantage of new execution platforms.

Execution platform advantages (i.e., high capability facilities) are automatically exploited without explicitly programming or reprogramming of those high capability facilities into the fabric of application programs. The generation program using this invention automatically incorporates these high capability facilities into the fabric of the application program. For example, multicore, instruction level parallelism and GPU subsystems among others may be exploited without effort on the application programmer's part. This invention is analogous to but a large improvement over high level language (i.e., GPL) compilers that allowed a GPL to paper over and hide the local variabilities in instruction sets of a wide variety of computers. GPL compilers worked well until the variety among computers began to be non-locally spread across the full architecture of the machine and compilers that could deal reasonably effectively with mostly local variability of instructions were unable to effect the global and sweeping alterations of form that are required to exploit broad architectural variations in these newer execution platforms. Dealing with architecture-wide variability is a qualitatively different kind of problem. Up to now, it has required a human programmer to reformulate the broad application architecture to accommodate and exploit the new architecture-wide variations in new machines. And just as applications that were written in native instruction level code became captives of specific machines, applications written to exploit broad architectural structures of specific machines once again became captives to those specific machines. GPLs could no longer hide such wide machine to machine variations. This invention introduces methods and machinery that hide the broad architectural variations among machines by allowing the application programmer to write implementation free applications (meaning there is no vestige of the machine architecture in the application specification) and then allowing this invention (in conjunction with the machinery claimed in patent application Ser. No. 12/363,738) to incorporate the global structures required to exploit those broad architectural features.

Coherent refinement of related but separated objects including operators, operands and even higher order objects (e.g., generative transformations) eliminates the combinatorially many cases that without it would have to be checked at one object of a related set of objects to determine what transformations had been previously applied to any related objects. In a similar vein, coherent refinement allows the merging of separated generator contexts (i.e., separated in time and space) so that needed information can be pieced together for use by a refinement at a later time when complete knowledge has been assembled for some generation step (e.g., reformulating loops as expressions of vector instructions). For example, knowledge of loops and their bounds may be available in the context of a domain operator (e.g., a convolution step operator) that defines how to process an input image pixel and its neighboring pixels into a corresponding output image pixel (e.g., each pixel in the neighborhood is multiplied by a convolution specific coefficient and then all of the results summed to produce the output pixel). Later, knowledge of how to compute those problem specific coefficient values to be used in the convolution step is discovered in a different context containing a "call" to a domain specific function known to produce such values (e.g., the W method-transform that is specific to the neighborhood of pixels). Putting these two pieces of knowledge together allows the generator to generate code that will compute the coefficients and store them in an array thereby setting up the preconditions for a design that exploits vector instructions available on the execution platform. Guided by domain knowledge to ensure the coherent coupling of the contexts that contain pieces of the data needed, setting up these preconditions is accomplished purposefully and without the large amount of problem space search that would be required to discover these relationships without the domain knowledge to establish this coherence across space and time contexts.

Non-interference of separate optimization goals allows the most sweeping goals to be achieved first and the less sweeping goals deferred until later. For example, the most profitable optimization goals or the goals that have largest affect on the overall target program design (e.g., designing for multicore parallelism) can be accomplished first and the less profitable goals or goals with more localized affects (e.g., Instruction Level Parallelism or ILP) can be accomplished later within the context of the architecture established by the more sweeping goals. This allows the most sweeping goals to establish the broadest form of the target program's architecture and the less sweeping goals to be achieved within the context of that broad architecture and without interference between the two goal sets.

Efficient Optimization Opportunity Detection is a hallmark of this invention. Rather than defaulting to strategy that looks for a broad list of possible optimization opportunities via an exhaustive search of the lowest level representation of the program (i.e., a GPL representation), the invention uses of domain specific knowledge embedded in higher level, pre-GPL representations to focus the search narrowly in a radar-like manner on only those likely candidate targets of optimization (e.g., neighborhood loops in convolution operations are known to be likely targets of ILP optimization). Thus, this invention uses domain knowledge to minimize the amount of search required to find and effect optimization opportunities. (See the example from the Coherent Refinement advantage.)

Ability to exploit the most useful domain specific knowledge at various times of the generation process by decomposing the optimization into subtasks allows each of these subtasks to best exploit the knowledge available to the generator at different times in the generation process. In an earlier example, one locale provided knowledge of loops needed to set up an array of coefficients needed by ILP instructions and a separate locale provided the specifics of how to calculate said coefficients.

Abstract Design Patterns allow deferral of detail design decisions until it is appropriate to effect them. This is important because reformulating the broad architectural structure of an application program is often a multi-stage process where the later stages cannot accomplish their part to the overall task until earlier stages have evolved the application design to a sufficiently concrete form wherein the later, very concrete structures can be formed and integrated. For example, design decisions that depend on other design details that are only available late in the design process or that do not have a sweeping affect on the details of the overall design will be deferred until the broad architecture of the target program is established. ADPs accomplish this by defining a common vocabulary (e.g., common generator variables), a common programming process context for the design, a set of constraints (e.g., constraints that will eventually evolve into explicit GPL loop structures) and a set of stand-in operations for design details to be determined later, where said stand-in operations are called the Intermediate Language (IL). By these mechanisms, the ADP establishes the descriptive intent of the eventual GPL code (including context, structures and relationships) without expressing the design in a fully determined GPL (i.e., prescriptive) form. For example, the constraints of an ADP do not provide complete prescriptive details of certain elements of the design (e.g., loop structures) but do provide goals and assertions that guide and constrain the eventual GPL forms that will be generated for those elements.

BRIEF SUMMARY OF INVENTION

This invention is a method and a system for expressing dependencies among separated parts of an intended application implementation that are being generated from an implementation free specification of the intended computation. It is also a method and a system for expressing dependencies among separated refinement steps that must work in concert to produce the intended application implementation. Moreover, the invention is a method and a system for using non-local constraints to maintain the constraint-defined relationship among space-separated parts within an implementation and among time-separated generation steps that produce the implementation, where the relationship is maintained even as the implementation goes through its step by evolutionary step changes in its evolution toward its final, GPL implementation form. That is, changes at one of the separated points are automatically compensated for by changes at the other, separated points so that overall consistency is maintained within the implementation generated. Similarly, changes produced by one generation step at one time during the generation are automatically compensated for by changes produced by a later, related generation step at a later generation time. By this invention, program design goals that may require a symphony of globally related operations to accomplish can be accomplished while still retaining the computational relationships required to faithfully fulfill the intent of the overall computation.

DRAWINGS

Drawing Figures

FIG. 1 is a phase by phase timeline of interrelated operations.

FIG. 3a shows transformation logic for operators coupled by DSL Convolution operation.

FIG. 5a is an example of an Abstract Design Pattern (ADP) object that relates domain objects to programming process objects (e.g., the Intermediate Language).

Figure 2A:
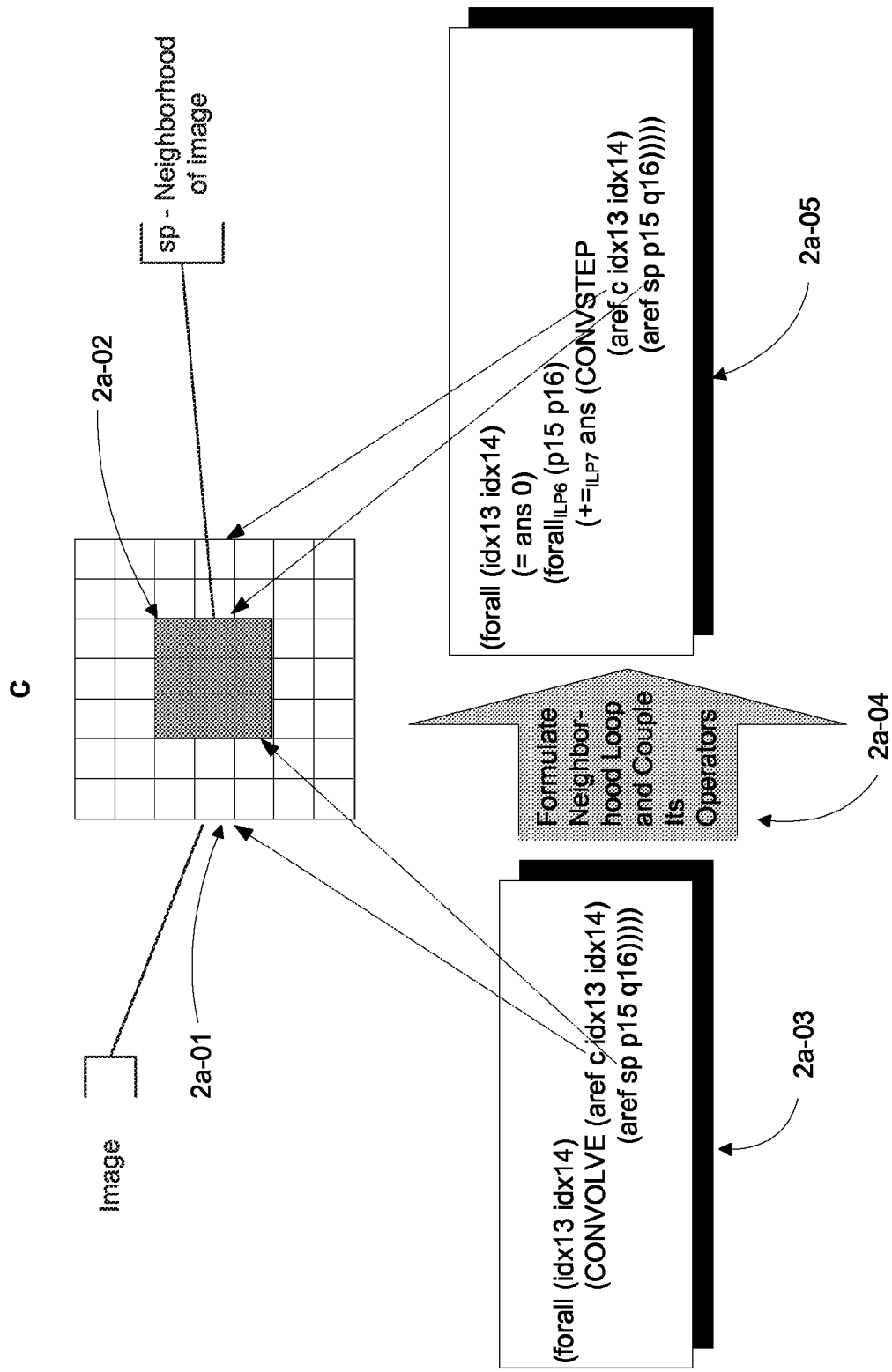
FIG. 2a is an example of the transformation from domain operator to loop.

KEY REFERENCE NUMERALS IN DRAWINGS 2a-01: Digital image c
2a-02: Neighborhood sp within image c
2a-03: Image loop with domain specific convolution operation in body
2a-04: Transformation to refine CONVOLVE operation into neighborhood loop with coupled, specialized operators forall$_{ILP}$ and +=$_{ILP}$
2a-05: Refined neighborhood loop resulting from transformation
2b-01: Transformation specializing CONVSTEP to ILP friendly form
2b-02: Transformation specializing W to ILP friendly form
2b-03: Generation of Preroutine to be executed when W is inlined
2b-04: Operation to create array for W's weights
2b-05: Operation to bind W's weight array to generator variable ?Dsarray
2b-06: Operation to create and populate weight array
2b-07: Left hand side (LHS) of transform to specialize CONVSTEP definition
2b-08: Right hand side (RHS) of transform to specialize CONVSTEP definition 2b-09: Left hand side (LHS) of transform to specialize W transform
2b-10: Right hand side (RHS) of transform to specialize W transform
2b-11: Preroutine of W of $sp_{ILP}$
2c-01: Digital image c
2c-02: Neighborhood sp within image c
2c-03: Neighborhood loop from 2a-05
2c-04: Transformation that inlines CONVSTEP's definition
2c-05: Neighborhood loop resulting from transformation 2c-04
2d-01: Digital image c
2d-02: Weight array from 2b-04
2d-03: Image loop with embedded convolution loop from 2c-05
2d-04: Transformation to recursively inline W's definition and trigger W's preroutine created by 2b-03, which will populate weight array with values
2d-05: Fully inlined image and neighborhood loops
4-01: Digital image c
4-02: Results of FIGS. 3a-b-c transformations to fulfill non-local constraints built into ILP operators
4-03: Convolution weight array needed for 4-02
5a-01: Abstract Design Pattern for a convolution operation
5b-01: Abstract Design Pattern for a convolution operation
5a-02: Signature of expression to which the ADP applies
5b-02: Signature of expression to which the ADP applies
5a-03: Superclass ADP from which this ADP inherits
5b-03: Superclass ADP from which this ADP inherits
5a-04: Context mapping from ADP role terms (e.g., image) to generator's design variables (e.g., ?a)
5b-04: Context mapping from ADP role terms (e.g., image) to generator's design variables (e.g., ?a)
5a-05: Intermediate Language (i.e., abstract building blocks for generation) specific to this ADP
5b-05: Intermediate Language (i.e., abstract building blocks for generation) specific to this ADP

DETAILED DESCRIPTION

The Problem

Domain Specific Languages (DSLs) have a distinct advantage over GPLs in that a large amount of complex computation can be specified with a small expression of DSL operators and operands. For example, an image convolution operation (see convolution definition below) can be expressed in a small number of symbols, e.g., "(convolve a w)" where a is an image and w defines a matrix of coefficients, where the dimensions of a and w define the extent of the implied iteration loops and where the definition of convolve for each [i,j] pixel of a is a reduction loop (also called a neighborhood loop) producing the output pixel corresponding to the a[i,j] input pixel, e.g., the sum for all p and q of w[p,q]*a[i+p,j+q], where the reduction loop processes some neighborhood of pixels around pixel [i,j].

More generally, an image convolution computes an output image from an input image where each pixel in the output image pixel is a computation of the neighborhood of pixels surrounding the input image pixel that corresponds to the output pixel. A typical neighborhood computation is the sum of all of the products of each pixel in a neighborhood of the current input image pixel times a coefficient specific to the relative position of the pixel within the neighborhood where the neighborhood is centered on the current input image pixel. Convolutions in general allow a wide variety of pixel-coefficient (more generally referred to as the map) operators (e.g., max, min, xor, plus, times, etc.) paired with related loop operators (more generally referred to as the reduction operators) (e.g., sum loop, product loop, min loop, max loop, xor loop, etc.).

The disadvantage of DSLs are that the structure and organization (e.g., nesting) of their naïve or straightforward GPL translations tend to reflect the structure and organization of the DSL expression. Unfortunately, that structure and organization is frequently fundamentally different from the optimal structure and organization that would be required to exploit high performance capabilities of the execution environments that the GPL code will run on. For example, a convolve operation for a single pixel a[i,j] would most generally be defined as a reduction loop of some kind (e.g., a summation loop) within which is nested some reduction-related pixel-coefficient map operation (e.g., coefficient times a pixel value). However, on certain execution platforms, viz. those with Instruction Level Parallelism (ILP), the whole reduction loop and the related pixel-coefficient operation are often expressible as a single machine instruction (e.g., one of Intel's PMADD instructions) or at worst, a handful of machine instructions suitably combined to express the full extent of the reduction loop. Unfortunately, direct generation of ILP instructions raises the possibility of conflicting optimization goals within a program generation system. This is most clearly seen with program generation systems that are able to achieve high performance improvement by using strategies that typically require an intelligent human programmer to put into practice. An instance of such a generation system is that of patent application Ser. No. 12/363,738 (Endnote 1) and its reduction to practice implementation, DSLGen. DSLGen introduces performance enhancing broad scale architectural features to the target program before generating low level details that might hide or conflict with those broad scale features. That is, DSLGen is attempting to achieve the large grain, high profit performance improvements before focusing on the small grain, lower profit performance improvements. Specifically, DSLGen uses abstracted partitions to divide a computation into chunks that can be computed in parallel (e.g., on multicore computers) before generating the instruction level details where the potential profit from parallelism is smaller. In the course of designing the broad scale architecture for those large computational chunks, the computational chunks may be woven together to minimize redundant computation (e.g., via the sharing redundant loops) and that the weaving may hide or obscure the opportunities for the instruction level parallelism. This obscuring occurs because the reduction loop operator of the convolution (i.e., the summation loop) may become separated from the pixel-coefficient operation (i.e., the times operation) by intervening code making the detection of the opportunity and the fusion of the reduction loop and pixel-coefficient operation into a single operation more difficult and costly. Additionally, simplification operations on the evolving code may introduce the possibility of a large number of variations to the forms of the reduction loops and their bodies. This increases the difficulty and cost of detection by introducing a combinatorial explosion of cases that need to be checked for, not to mention the explosion of possible case-specific rewrites that arise from combinations of other sets of properties (e.g., execution platform properties).

On the other hand, if the generator chooses to generate the ILP code first (i.e., before attempting to find the broad chunks), then the job of finding the broad chunks that can be computed in parallel becomes extraordinarily difficult and costly. The generator is looking for broad scale chunks among a large number of low level details, details at the machine instruction level. The compounded structure and clear out-lines of the broad scale chunks are easily camouflaged by the jungle of ILP details. This is why highly general tools for parallelizing existing GPL code have had very modest success to date. Algorithms that attempt to recover the broadest chunks of code that can be computed in parallel from the lowest level of GPL details typically end up recovering a number of smallish chunks. Using this strategy in the generator would in effect mean that it is effectively trying to recover the valuable domain specific knowledge (e.g., the fact that the reduction loop taken together with the pixel-coefficient operation is conceptually a single concept, i.e., a convolution) in order to identify the whole structure as a broad chunk that represents a opportunity for parallel expression. This is exactly the domain knowledge in the DSL convolution expression that was lost when the convolution was translated into a series of GPL or machine level instructions. This domain specific knowledge provides a large amount leverage in the job of establishing a computation's large scale architectural features, leverage that turns a really difficult and costly problem into a tractable one.

Beyond the general argument that, in the context of automatic generation, broad design followed by low level design produces arguably the best overall performance improvement, consider that during its early design stages where the broad features of the computation are being established, DSLGen purposefully creates the necessary preconditions for successful ILP optimization of the reduction loop (e.g., preconditions that are tailored to accommodate Intel's PMADD instruction). That is, it reorganizes the low level details so as to hand this optimization opportunity to the later optimization phases on a silver platter. Therefore, it is logical that it should also make the set up of this silver platter easy to recognize by those later stages without a huge amount of complex analysis. And in fact, DSLGen does exactly that by the machinery of this invention. Specializing the summation and pixel-coefficient operator types not only couples them for the purpose of re-forming them into ILP forms, it also makes them stand out as signal flags to the recognizer so that a minimal amount of search is required to trigger the ILP optimization later in the generation process. By contrast, a generalized optimizer working on GPL would likely be unable to create the preconditions necessary for casting the loops into IPL form and therefore, would likely miss this opportunity for parallelization of the neighborhood loop.

Broadly speaking, the DSLGen generation philosophy is that the best overall performance improvement is achieved by first establishing the broad scale design features of the target program that will likely provide the biggest chunks of performance improvement (e.g., data decomposition to accommodate thread-based parallelism) and by later dealing with the smaller chunks that are likely to yield lesser performance improvement (e.g., ILP reformulation of loops). In a recursive sense, the ILP optimization process itself has its own broad and narrow design stages separated in generation time: the early broad design activity recognizes the opportunity for ILP optimization of a convolution's neighborhood loop and sets up the preconditions for its success (and by setting up the preconditions, maximizes the ILP parallelization opportunities), and the later design activity reformulates the loop into ILP instructions.

However, by the time the generator gets to this second stage, the domain specific operators have been converted into (reduction) loops distinct from the individual pixel-coefficient (map/accumulate) computations and these domain related parts are separated within the evolving code. How does the generator retain the domain relationship (i.e., non-local constraints) between the separated but related parts (e.g., reduction loop operation and the pixel-coefficient map/accumulate operation of the convolution's definition) so that when the time comes, the generator will be able to recognize that even though they are separated from each other, they are domain-specifically related and are ideally set up for ILP representation? What is needed is a method by which to couple the two parts (e.g., the reduction loop and map/accumulate operators) such that their transformation into ILP form makes the proper and coordinated transformations from their individual manifestations to their re-combined manifestations (i.e., an expression of vector instructions) in the target program. Further, the knowledge that together they represent the domain concept of a convolution neighborhood loop will provide knowledge to the generator that the pre-ILP context was previously and purposely set up to make the conversion to the ILP form straightforward.

The Solution

Rather than take a passive approach to exploiting ILP opportunities as most GPL oriented optimization programs do, DSLGen takes an active role by manipulating the structure of the target program to create specific opportunities to exploit ILP facilities provided by the execution platform. It has a significant advantage in this task in that it has the leverage provided by domain specific knowledge. In the example used to illustrate this, DSLGen knows about convolution operations and in particular, that the neighborhood loops of a convolution are often exactly the kind of computation that lends itself to ILP. Further, it knows about the provisional structure of convolution computations and that knowledge guides the process whereby the pre-conditions are established that will lend themselves to ILP formulations. This process exploits the domain specific knowledge that will guide the reformulation of the method w of a neighborhood to use an array of values as its coefficients thereby establishing preconditions for the neighborhood loop in which w occurs to be reformulated as one or more ILP instructions (e.g., one of the PMADD family of instructions).

FIG. 1 is an overview of the overall process showing what operations are occurring for each relevant generator phase in the furtherance of the ILP design feature encapsulation. First, the Partitioning and Loop Localization phase begins the process by formulating the convolution implied loops over the image and convolution implied loops over the neighborhood of each image pixel. This is the point at which, if the execution platform specification allows ILP, the neighborhood loop is generated using coupled operators (e.g., $forall_{ILP}$ and $+=_{ILP}$) which signals the opportunity for re-expressing this loop as an ILP loop. Most importantly, these coupled operator instances know explicitly about each other and retain the information that together they are an expression of a convolution neighborhood loop.

This first step is illustrated in the example of FIG. 2a, which shows the relationship among:

1) The before (Ref. 2a-03) and after (Ref. 2a-05) convolution code forms (See a note on the expression formats used in these figures in the next paragraph),
2) An image c (2a-01), which is to be convolved, and
3) A neighborhood sp (2a-02), which will supply the coefficients (or weights) of the convolution operation.

These examples are expressed in a list-oriented prefix form where the operator or function name is represented as the first element of a list. Thus, an operator that is normally shown as an infix operator (e.g., "x+y") would have the operator shown as the first element of the list (e.g., "(+x y)) followed by the arguments separated by spaces (rather than commas). In this example, the operators include assignment (i.e., "="), incremental assignment (i.e., "+="), loop operators (i.e., "forall"

and "forall$_{ILP}$"), array indexing (i.e., "(aref c idx13 idx14)") and expressions of domain specific operators (e.g., "CONVOLVE" and "CONVSTEP").

Before the formulation of the neighborhood loop, the as-yet-to-be-translated neighborhood loop is represented by the CONVOLVE operator applied to the pixel of c, i.e., (aref c idx13 idx14) and a relative offset from the center of the neighborhood, i.e., (aref sp p15 q16). The aref operation is the internal form that represents an indexing operation (e.g., its form in the C language would be c [idx13] [idx14]). Idx13 and Idx14 are the provisional target program index variables for the loops that traverse the image c. They may be changed to other variable names later in the generation process because the generator might decide to exploit some loop sharing, hence the "provisional" designation for these variables. Finally, the abstract design object sp is treated as if it were simply a 2D matrix using the indexing operation (aref sp p15 q16), where p15 and q16 are the provisional target program variables that index over the neighborhood sp. In this case, "aref" behaves as if it were an object-oriented method of the sp design object. The neighborhood sp is shown overlaying a portion of the image c.

The second group of related operations shown in FIG. 1 happen during the inlining phase of DSLGen. This is where the Intermediate Language (IL) definitions are inlined. The IL represents the set of convolution design pattern abstractions that stand in for elements and operations of the target program language (e.g., C) that have not yet been determined. For example, the DSL definitions for design pattern abstractions like CONVSTEP and (W sp . . . ) will be substituted into the abstract program during this phase. Up to this point, the IL definitions may have been transformed (i.e., specialized) to encapsulate (or incorporate) some of the design features of the execution platform or some design features desired by the application programmer. This design feature encapsulation in the IL is a key mechanism of evolving the implementation independent specification into an execution platform specific implementation that exploits high capability features of the execution platform (e.g., parallelism). In fact, even during the inlining phase itself, encapsulations continue to occur and ILP is a prime example. The inlining of the CONVSTEP definition will trigger the encapsulation of the ILP design feature in the IL associated with the convolution step and the neighborhood object.

In DSLGen, the inlining (i.e., substitution) of IL definitions is delayed until later in the generation process because DSLGen may need to transform these definitions to encapsulate (i.e., to incorporate) other design features required by the execution platform or desired by the user. These encapsulations may redefine the IL definitions. For example, the computation may need to be partitioned to take advantage of multicore parallelism and that partitioning is likely to decompose the convolution loops into a number of more fine grained loops each of which handles only a part of the overall image. Because the ILP formulation process requires knowledge that is not available or not settled until after all encapsulations and substitution of these definitions are complete, the process that is setting up the preconditions for ILP needs to leave signal flags for the later generation phases to indicate where the ILP opportunity has been set up and what are the related but separated parts that will take part in the ILP re-expression. The multi-stage characteristic of ILP generation is a key motivation for this invention. These signal flags (i.e., in this example the coupled operators) not only identify the ILP opportunities but they also provide coupling and constraint relationships that will be used by the later phases to coordinate the re-expression of conventional loops as ILP instructions. For example, if an ILP instruction accomplishes all or part of the loop's iteration job, the loop expression must be reduced or eliminated accordingly.

Figure 2B:
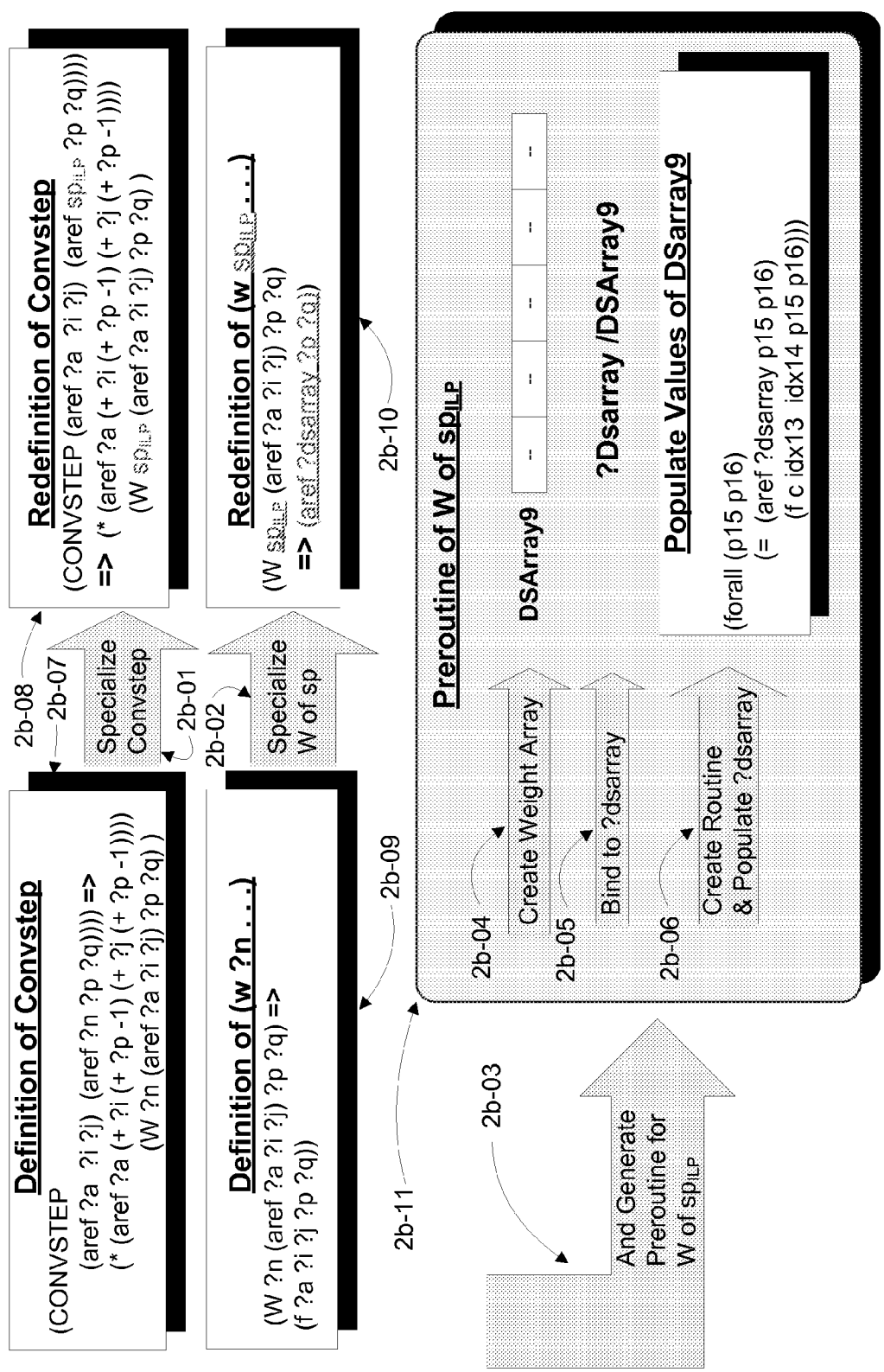
FIG. 2b illustrates inlining of domain operators and the operations it triggers.

FIG. 2b is an overview that illustrates the ILP encapsulation process that occurs during the inlining phase of the generator. This is a process that illustrates another aspect of coupling, viz. the coupling of two interrelated generative processes that execute at different times and locations but cooperate to achieve the overall aim of setting up the neighborhood loop to be expressed via ILP instructions. The first process in FIG. 2b is the specialization of CONVSTEP and W for ILP expression (i.e., steps 2b-01 and 2b-02). The specialization of CONVSTEP (2b-01), which produces the new transformational definition of W of sp$_{ILP}$ (comprising 2b-09, 2b-02 and 2b-10) and its preroutine (2b-11), is an example of a transformation generator chain. The specialization of W for ILP is an example of a dynamically generated transformation. This process is triggered by an ILP design feature in the execution platform specification. In the course of specializing these two definitions for ILP, this process also generates a preroutine (i.e., item 2b-II) (See next paragraph for further information on preroutines) (i.e., via step 2b-03) for a new w of sp$_{ILP}$, where sp$_{ILP}$ is a specialization of sp that is specific to ILP formulations. Later, when W of sp$_{ILP}$ is being inlined, just after a successful match of the left hand side (lhs) pattern (i.e., item 2b-09) of w of sp$_{ILP}$, this preroutine will execute to create and populate an array (e.g., dsarray9) that will hold the weight values of sp. (The lhs pattern of a transformation is essentially a generalization of a conventional calling sequence and for the purposes of this description can be conveniently thought of in this way.) The preroutine also creates a binding for the pattern variable ?dsarray that is needed in the right hand side (rhs) of the definition. Now, let us examine this process in more detail.

DSLGen (the preferred embodiment) provides a facility for user written Preroutines that will be run after a successful pattern match of the left hand side of a transformation. These Preroutines perform operations that are not well adapted to pattern matching (e.g., data management operations). The Preroutines can succeed or fail. If they fail, the overall transformation with which they are associated fails. If they succeed, the overall transformation is allowed to succeed and optionally, the preroutine may also extend the binding list to provide additional bindings for use in instantiating the right hand side of the transformation.

Step 2b-01 During the inlining of CONVSTEP, there is a choice between a default CONVSTEP definition or a customized CONVSTEP definition. In the example shown, the customized definition is triggered because the execution platform specification includes an ILP design feature (e.g., a feature called "SSE" that indicates the availability of Intel's SSE instruction set). In the course of developing the customized definition, the neighborhood (e.g., sp) will be specialized to an ILP specific neighborhood object (e.g., sp$_{ILP}$), which will cause the use of IL definitions that are specialized to the ILP design feature. Without the ILP design feature, step 01 would not execute, the default definition of CONVSTEP would be inlined instead and no further processing would be triggered. However, with the ILP design feature, in addition to Step 2b-01, Steps 2b-02 and 2b-03 are also triggered by CONVSTEP's inlining.

Step 2b-02: W of sp is specialized to operate on sp$_{ILP}$ and is also redefined to fetch its weight value from a specific pre-computed array (e.g., dsarray9) that will be created by W's preroutine where the pre-computed array will be bound to the ?dsarray pattern variable by the preroutine.

Step 2b-03: The final step in the inlining of CONVSTEP will create a preroutine for W of $sp_{ILP}$. Later in the processing when W of $sp_{ILP}$ is inlined, Steps 2b-04 through 2b-06 will be executed. Those steps accomplish the following tasks.

When the preroutine is finally invoked later, it performs steps 2b-04, 2b-05 and 2b-06.

Step 2b-04: The preroutine creates an array (e.g., dsarray9) to hold the values of the weights.

Step 2b-05: The preroutine binds the newly created array to the pattern variable ?dsarray so that when the definition of W of $sp_{ILP}$ is inlined it will become something like "(aref dsarray9 p15 p16)" where the example variables dsarray9, p15 and p16 will be variables in the target program being generated.

Step 2b-06: The preroutine contains skeleton code for populating the array, where that skeleton code was generated by Step 2b-03. The original right hand side (rhs) of w (e.g., "(f ?a ?i ?j ?p ?q)" in item 2b-09) is incorporated into the skeleton code in instantiated form (e.g., "(f c idx13 idx14 p15 q16)") where the instantiation values come from matching the signature pattern (i.e., item 5a-02) of the convolution's abstract design pattern FIG. 5a. These instantiations arose from the point earlier when the convolve operator expression was originally recognized and translated into the form shown in 2a-03 and they have been carried along to this step. After instantiating the skeleton code with all of the bindings (i.e., from the match of item 5a-02) and including those created in the preroutine (i.e., item 2b-11) of W (e.g., (?dsarray dsarray9)), the skeleton code will be partially evaluated to produce the initial values for the array. If the evaluation produces constant values, this step will produce a declaration that is the internal form that will eventually be converted to C code such as:

int dsarray9 [3] [3]={{-1-2-1} {0 0 0} {1 2 1}}};

Most often, this array population will happen at generation time, because values can be determined at generation time. But if the results of the partial evaluation cannot be reduced to constants, then the generator will produce a declaration without initial values such as int dsarray9 [3] [3];

supplemented by preamble code to the neighborhood loop (i.e., the partially reduced form of the precursor code produced by step 2b-06) and that preamble will produce those values for dsarry9 at execution time. If data dependencies prevent even that (i.e., each coefficient can only be computed just before its use), then the ILP conversion will fail because in this case, the potential parallelism provided by the ILP instructions will be defeated by the incrementalism inherent in the calculation of the data vector. So, the neighborhood loop will not be able to take advantage of ILP instructions. However, this latter case is typically an anomalous case and is infrequent in normal computational environments.

Figure 2C:
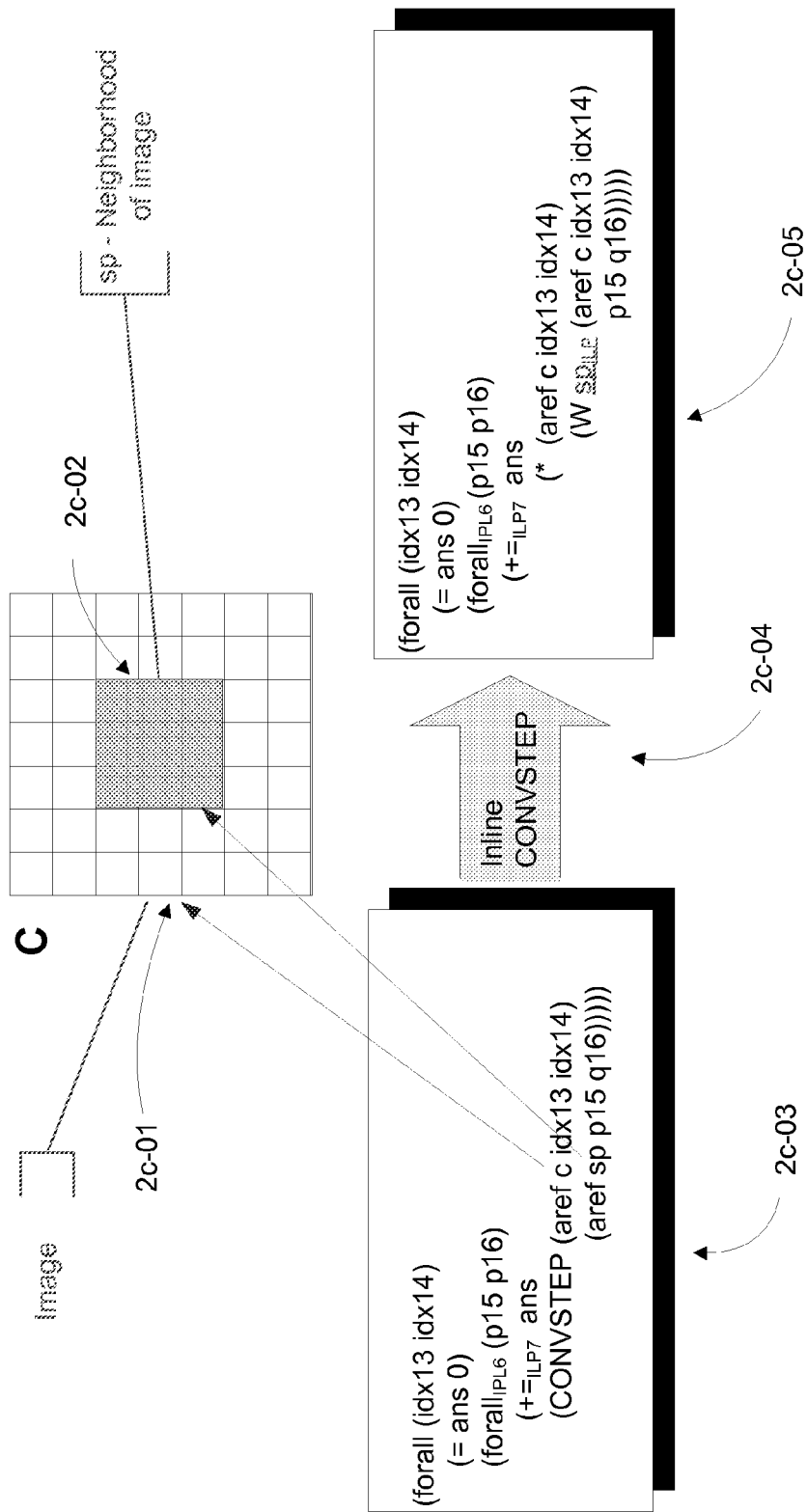
FIG. 2c shows the first part of FIG. 2b operation—inlining of convstep operation.

FIG. 2c illustrates an example of what is happening to the internal program representation as CONVSTEP is inlined. Behind the scenes, Steps 2b-01 through 2b-03 are occurring during this transformation.

Figure 2D:
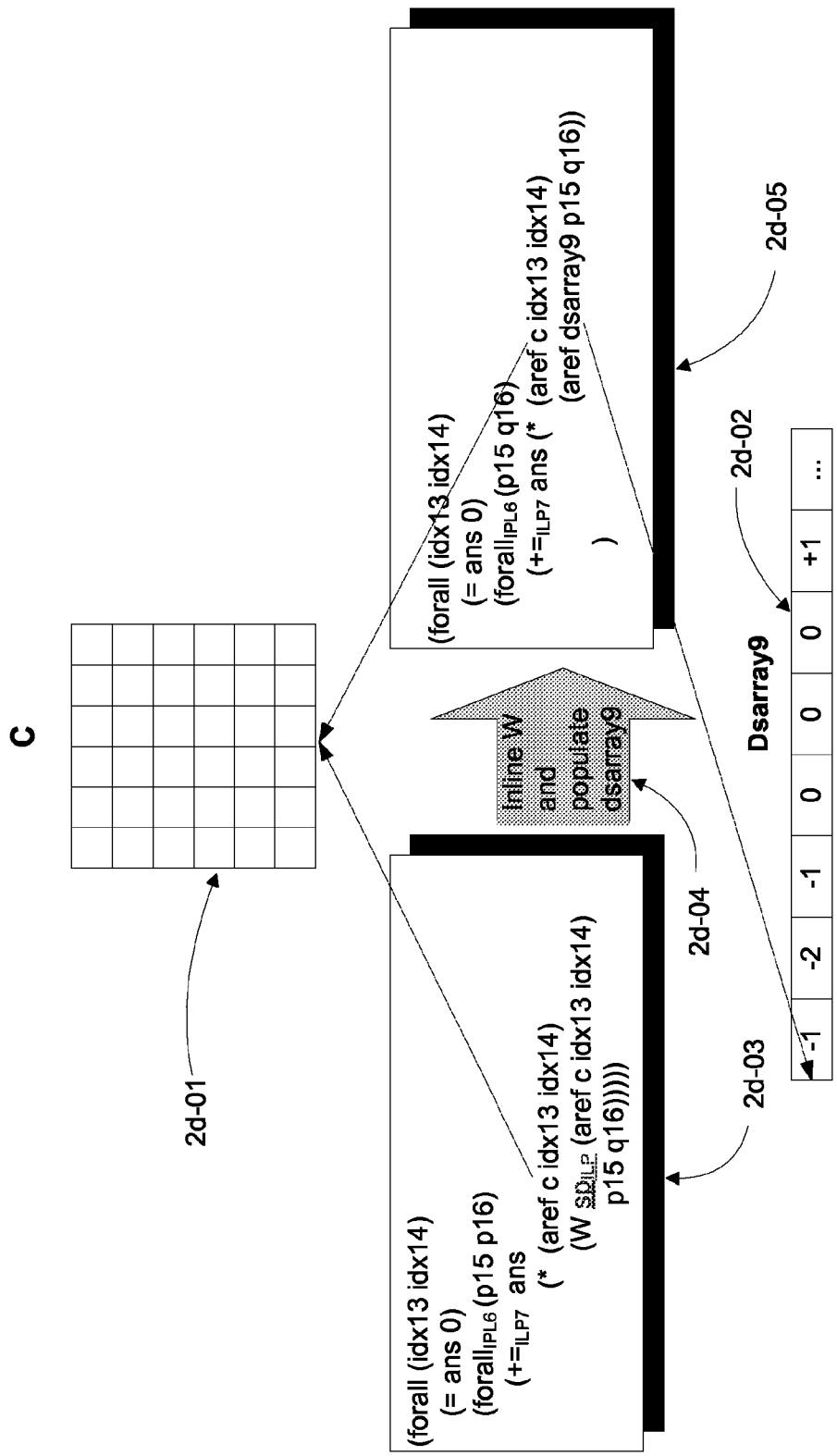
FIG. 2d shows inlining of W and the results of triggered code to populate weight array.

Similarly, FIG. 2d illustrates an example of what is happening to the internal program representation as W is being inlined at a later time in the generator's processing. Similarly, Steps 2b-04 through 2b-06 are occurring during this transformation.

The Loop Simplification phase from FIG. 1 occurs after all inlining is complete. Among the transformations triggered during this phase is the transformation that re-expresses the neighborhood loop with the coupled operators as an expression of ILP instructions.

Figure 3B:
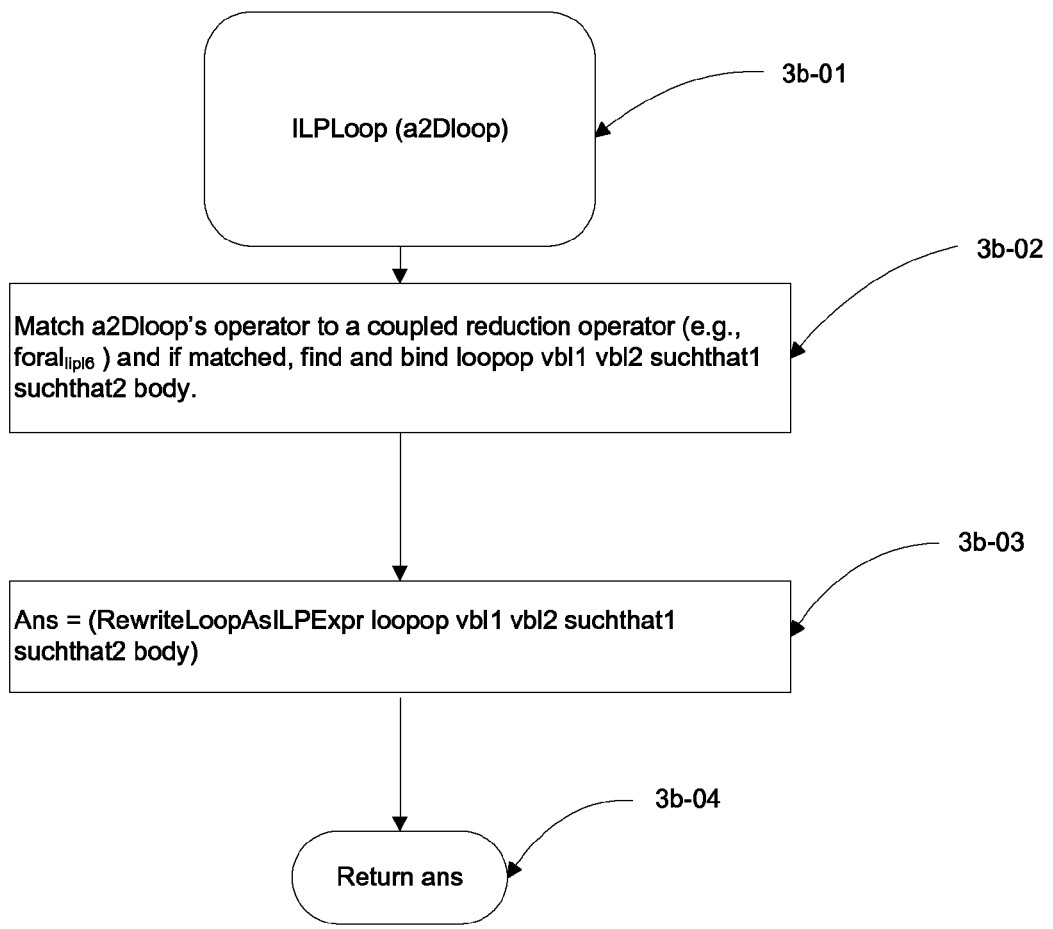
FIG. 3b shows logic that identifies coupled operators.
Figure 3C:
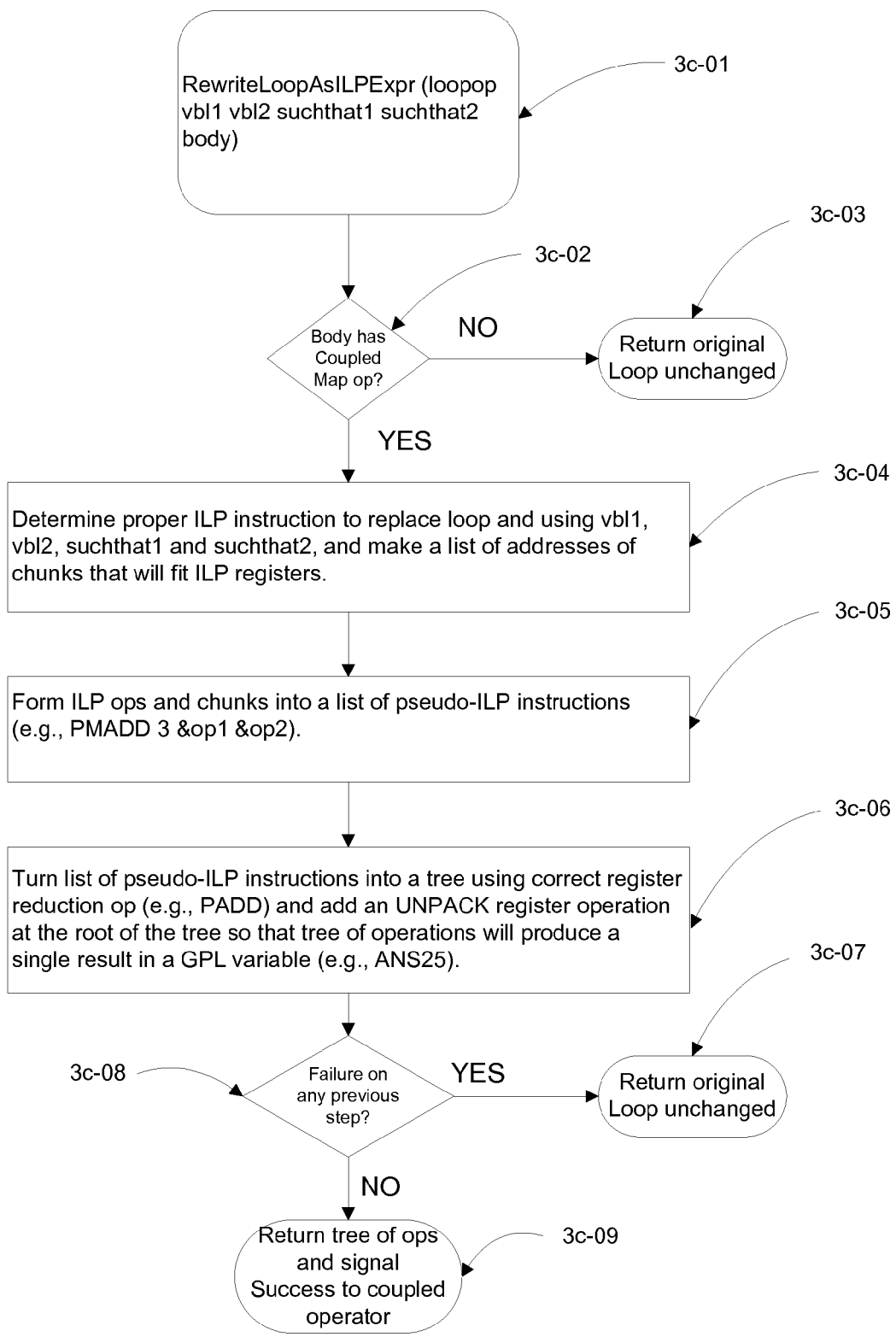
FIG. 3c is shows logic that converts coupled map-reduce loop to ILP instructions.

The details of this process are defined in FIGS. 3a-c. FIG. 3a deals with the possibility that program structures have been added before or after the $+=_{ILP}$ operation. It handles one map operation plus one step of the reduction process and succeeds if there is no preblock or postblock of code, or if there is a preblock that has no data flows into the $+=_{ILP}$ expression. The main logic for reformulating the coupled pair is handled by FIGS. 3b and 3c. ILPLoop of FIG. 3b handles identifying the coupled operators, deconstructing the neighborhood loop into its parts and then calling RewriteLoopAsILPExpr (FIG. 3c) to construct the actual ILP form of the loop or, failing that, to return the existing loop unchanged.

Figure 4:
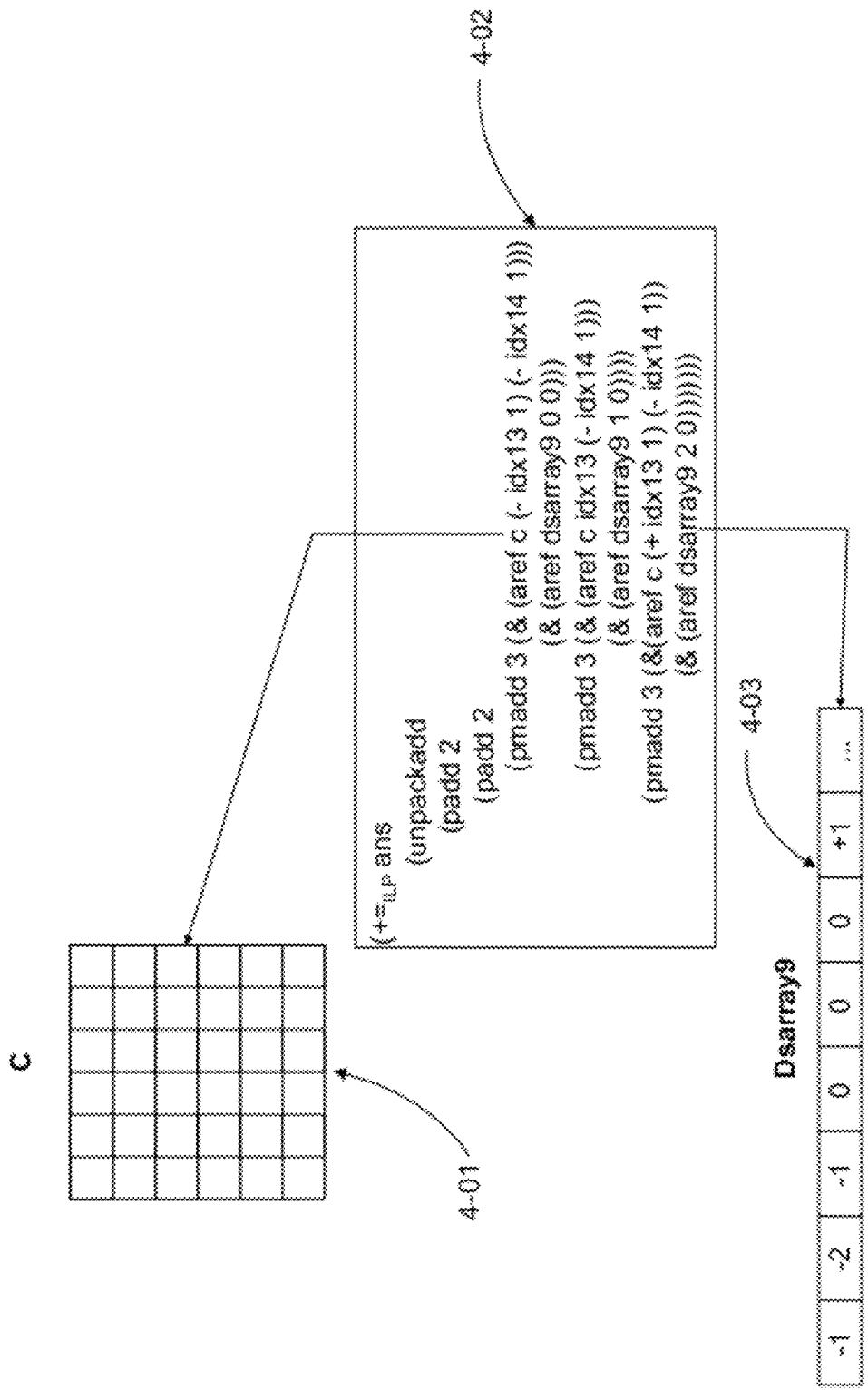
FIG. 4 is an example map-reduce (i.e., neighborhood) loop expressed as ILP instructions.

FIG. 4 is the ILP version of the neighborhood loop that is formed if the re-expression is successful. The unpackadd (where, unpackadd is a convenient pseudo-SSE instruction that is implemented via a short series of machine instructions), padd and pmadd abstractions are modest generalizations of the actual SSE instructions. In practice, these generalizations are defined as C #define macros that reduce these generalizations to the explicit SSE instructions while dealing with low level issues such as register loading and register assignment for communication between the individual SSE instructions.

Several question remains unanswered. How did the various operations know how to choose the objects and IL that they were manipulating? How can the generator represent elements of the target program that cannot yet be determined because information that they depend on has not been determined? And how does the evolving design pattern progress toward a concrete expression of the design and keep track of the evolving parts thereof? The example driven figures elided these problems by illustrating the operations via somewhat specific examples, which make the general operations easy to understand because the specificity allows human (domain specific) intuition to make the connections. The technical answer to these questions is that the generator uses an Abstract Design Pattern object (illustrated in 5a-b) to provide the machinery necessary to solve these various problems.

The ADP provides mechanisms to:
Define and name an Abstract Design Pattern (Lines 5a-01 and 5b-01)
Recognize the expression in the AST to which the ADP applies (Items 5a-02 and 5b-02).
Inherit parts from more general ADP definitions (Lines 5a-03 and 5b-03).
Connect ADP roles to the pattern variables that will be bound to concrete AST expressions (Definitions at 5a-04 and 5b-04).
Define the Intermediate Language used to stand-in for elements of the target program that are not yet fully determined (Definitions at 5a-05 and 5b-05).

The ADP defines meta-information that will be used by the transformations that evolve the code for the target program. The exact structure of portions of the final code (e.g., various loops and their context) is implicit and only fully determinable after the full evolution of the ADP into code. The implicit structures may include, for example, sets of loops implied by domain specific operators (e.g., a convolution operation on an image and a neighborhood template of that image), a recursion design based on a domain specific tree structure, a design framework exploiting domain specific algorithms that may be well tailored to a specific design feature (e.g., a Red-Black tree), a synchronization based pattern for parallel computation (e.g., shared queues or a Single Program Multiple Data design) and variations of those sorts (e.g., loops partitioned into separate thread routines).

The explicit information of an ADP, on the other hand, is represented as explicit data within the ADP. One kind of explicit information (i.e., Items 5a-04 and 5b-04) expresses the meta-relationship between domain specific conceptual roles defined within an ADP and the pattern variables that will be bound to specific instances of expressions playing that role in target program AST. For example, a role might be a "template" and its corresponding pattern variable might be "?s". Thus, this establishes a common naming convention within the generator's transformations that allows them to share data consistently. Furthermore, the roles allow higher order transformations that are applied to IL definitions to encapsulate design features and those higher order transformations are written in terms of role names. When combined with an ADP context, the high order transforms to perform a generalized operation (e.g., mapping an index variable from one range to another) on variety of specific IL definitions whose concrete variables can vary from ADP context to ADP context. For example, a high order transformation might apply a role-base rule of the form $Pindex_0 => (Pindex_1 - PindexLow_1)$ in the context of the ADP of FIG. 5a to map the variable ?p to (?p−(−1)), which with simplification would finally become (?p+1). This is exactly what happens when the generator is encapsulating the design feature that requires arrays to be indexed like C language arrays (i.e., from 0 to (n−1)) rather than like the Image Algebra DSL (i.e., from −(n−1) to +(n−1), or as a concrete example, from −1 to +1).

Another kind of explicit information in an ADP is an expression of the IL stand-ins from which the target code will be built. For example, the "row" or "col" stand-in represents how to compute an image row or col from a centering pixel and a template offset pixel in the context of some loop that is only implied by the ADP. Thus, in steps 2b-01, 2b-02 and 2b-03, the generator process that is reformulating the CONVSTEP result to be expressed as ILP instructions knows (in a domain specific sense) that the weights need to be put into an array. The ADP context tells the generator process that the weights are computed by a method-like operator "w" applied to a neighborhood template that will be bound to "?s". This gives it enough information to find the (w sp) definition and a pattern that will recognize the instance of (w sp) in the definition of CONVSTEP (i.e., lhs of step 2b-01). This allows it to decompose that definition, reformulate the new definition (i.e., rhs of step 2b-01) and additionally, create the other needed forms for steps 2b-02 and 2b-03.

Within the IL definitions, some may not refine into explicit code but rather will have some affect on the final form of the explicit code. For example, the IL definition "(partestx ?s:template)" in item 5a-05a, will refine to a concrete condition that may limit the range of a loop partition, e.g., "idx3==0" and thereby limit the loop to operating only on the pixels on one of the image's edges. That is, if the general loop definition has the GPL C code form:

for (idx3=0; idx3<m-; idx3++)
   for (idx4=0; idx4<n; idx4++) {loop body}.

(i.e., the general form consists of two loops traversing the whole image) then adding a condition like "idx3==0" to the loop description will specialize the general form into a specialized "for" loop that traverses only one edge of the image:

for (idx4=0; idx4<n; idx4++) {loop body with 0 substituted for occurrences of idx3 in the body}.

The signature-like expressions in the ADP signature, context and IL fields are shorthand patterns that are formed into operational patterns by the generator. Thus, the form "?a: image" will form a pattern that will match an expression whose type is an image type or subtype thereof and bind the matched expression to the pattern variable "?s". For example, in the context of FIG. 2a, a pattern match of the "(CONVOLVE . . . )" expression in of the lhs transformation would result in "?s" being bound to "c".

In short, the ADP provides indirect connections to all of the piece parts of the evolving program that the program generating transformations will need to work with. The connections are either through Pattern matching (e.g., matching an ADP pattern to an expression that must be refined into some concrete instance of the design structure), Through indirection (e.g., To form an target program expression involving the neighborhood template of a convolution, the generator uses the binding of "?s" in FIG. 5a or 5b), or Through the method name of an IL expression, which is referred to as a semantically-based connection.

Figure 5B:
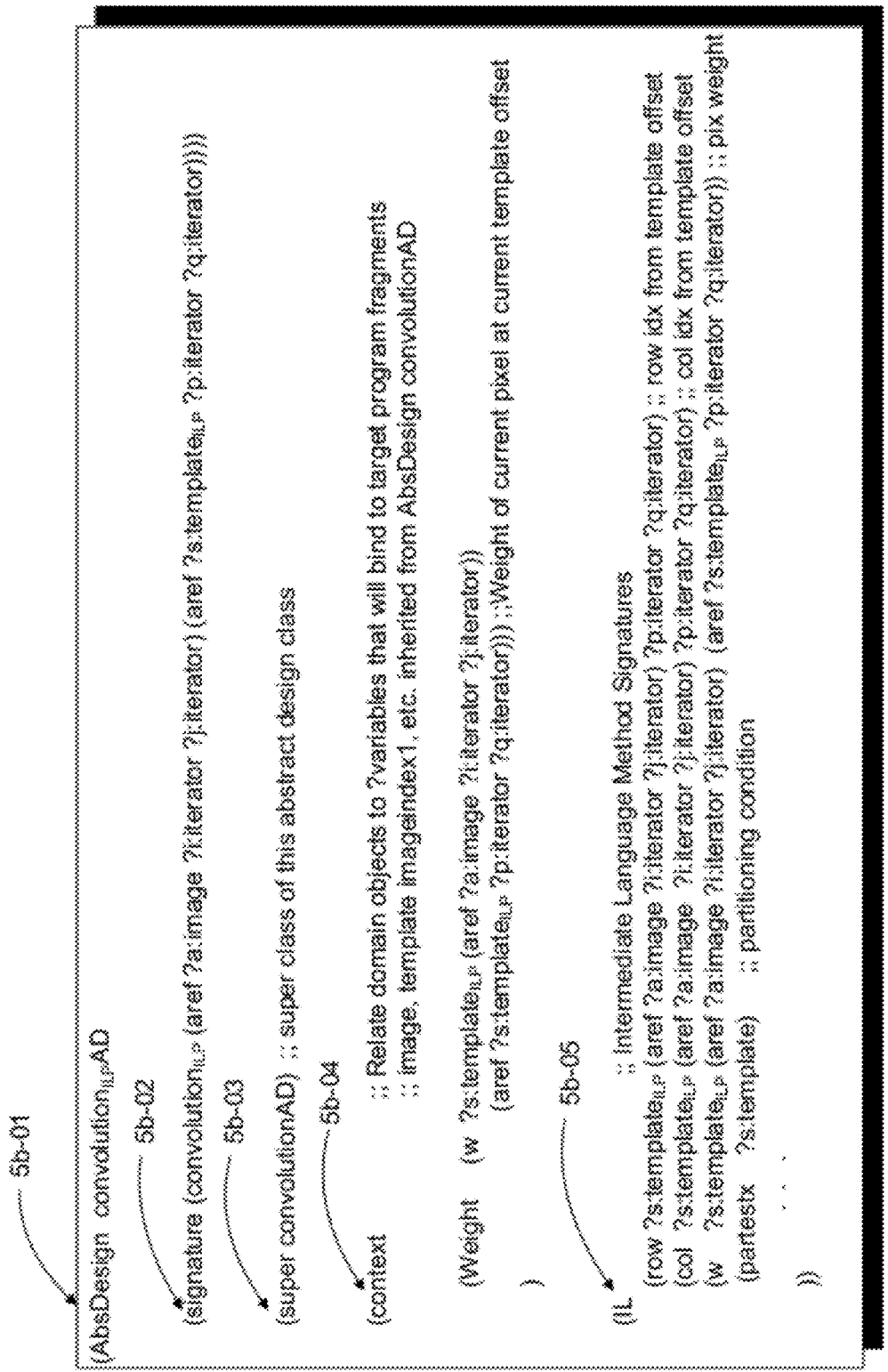
FIG. 5b is an example of an Abstract Design Pattern (ADP) object that is specialized for ILP.

The specific ADP that applies to a domain specific operation is chosen based on the particulars of the operation (e.g., a convolution) plus other specifications of design requirements, application programmer desires and execution platform opportunities (e.g., on an execution platform with ILP the ADP shown as FIG. 5b might be chosen, subject to approval by the application programmer).

What is claimed is:

1. A method of constructing and utilizing non-localized constraints to define and maintain interrelationships among separated entities within a computation while said entities are being transformed, the method for recognizing separated entities that are coupled by non-localized constraints, decomposing said separated entities into constituent subparts and reformulating said entities to incorporate a design feature such that said separated entities after reformation achieve a computational outcome that is equivalent to that achieved by said separated entities before reformation, where said non-localized constraints are an implicit or explicit expression or description of logical or physical relationships among separated but related entities of a computation or a computation's specification such that a re-formulation of one or more of said separated but related entities assures compensating changes to others of said separated but related entities so as to maintain said non-localized constraints relating said separated but related entities, wherein said separated but related entities include but are not limited to computer program language entities or precursors thereof or manifestations of hardware entities or specifications and other precursors of hardware entities;

where said non-localized constraints are expressed as coupled program parts and coupled transformations, where a coupling implies an action linkage between a coupled set of parts such that changes to or actions on one element of said coupled set trigger compensating changes to or actions on other elements of said coupled set, and where a coupling implies an additional linkage between a plurality of coupled program parts and an abstract design pattern that represents a coordinated refinement goal of said coupled program parts and that provides a pattern of name-based connections, semantically-based connections and pattern-driven connections to relate various elements of separated contexts;

comprising:

constructing said non-localized constraints by coupling separated but related entities and generation operations, providing transformation by way of refinement activities and the causal connection of refinement activities to refinement events, whereby causal connection mechanisms include the generation of preroutines or other executable entities triggered upon the occurrence of refinement activities, and utilizing said non-localized constraints by re-formulation operations on one or more of said separated entities, where said re-formulation operations trigger said transformation;

recognizing coupled parts;

determining a reformation objective of said coupled parts;

decomposing an expression containing said coupled parts into said constituent subparts and determining roles of said constituent subparts; and reformulating said coupled parts according to said reformation objective while making, triggering or scheduling compensating changes required by said non-localized constraints.

2. A method of claim 1 for recognizing separated entities that are coupled by non-local constraints, decomposing said separated entities into constituent subparts and reformulating said entities to incorporate a design feature such that said separated entities after reformation achieve a computational outcome that is equivalent to that achieved by said separated entities before reformation, where said non-local constraints are expressed as coupled program parts and coupled transformations, where a coupling implies an action linkage between a coupled set of parts such that changes to or actions on one element of said coupled set trigger compensating changes to or actions on other elements of said coupled set, where a coupling implies an additional linkage between a plurality of coupled program parts and an abstract design pattern that represents a coordinated refinement goal of said coupled program parts and that provides a pattern of name-based connections, semantically-based connections and pattern-driven connections to relate various elements of separated contexts;

comprising:

recognizing coupled parts;

determining a reformation objective of said coupled parts;

decomposing an expression containing said coupled parts into said constituent subparts and determining roles of said constituent subparts; and reformulating said coupled parts according to said reformation objective while making, triggering or scheduling compensating changes required by said non-local constraints.

3. A method of claim 1 for achieving constraint-required compensating changes during an incorporation of design improvements that reformulate coupled entities;

comprising:

effecting a refinement of coupled entities such that an action linkage between coupled parts is invoked as required to make compensating changes immediately or to provide triggers that will allow deferred execution of compensating changes that must await intervening actions or intervening information development; and effecting re-combination with reformulation of separated but coupled entities to exploit improvement opportunities provided by an execution platform or by a chosen program design.

4. A method of claim 1 for coordinating related refinement activities across generation time and implementation space, the method comprising:

revising future but related generator refinement transformation behaviors to use knowledge and purpose available at a current generation time and location within a program, wherein said knowledge and purpose is used to modify said future but related generator refinement transformation behaviors so that modified behaviors of said future but related generator refinement transformation behaviors will coordinate with and be modulated by said knowledge and purpose available at said current generation time and said location within a program.

5. A method of claim 1 for automated construction of pre-conditions required to exploit execution platform specific optimization opportunities, where said pre-conditions are achieved by a process of reformulating computational structure;

comprising:

determining said pre-conditions by using domain specific knowledge of an execution platform, and reformulating a computation to create and use operations and data required by said pre-conditions.

6. A method of claim 1 for creating and utilizing a transformation generator chain that communicates, extends and coordinates transformation contexts across spans of generation time and target program space, and where a transformation generator chain is a series of transformations created at generator run time, where a link in said transformation generator chain is a transformation in said series, which may generate subsequent links, and where said link has a target generation time and a remote location within a target program built into its triggering mechanism so that it will automatically trigger at a correct time and a correct location within a target program;

comprising:

creating said link in said transformation generator chain;

creating said transformation contexts for said link;

creating a trigger mechanism for said link in said transformation generator chain;

carrying, extending and applying said transformation contexts to their targets in generation time and program space; and utilizing said transformation generator chain by generator actions that trigger said transformation generator chain.

7. A method for specifying and using abstract design patterns to partially and provisionally constrain generation of a plurality of implementations of said abstract design patterns, and for recognizing separated entities that are coupled by non-local constraints, decomposing said separated entities into constituent subparts and reformulating said entities to incorporate a design feature such that said separated entities after reformation achieve a computational outcome that is equivalent to that achieved by said separated entities before reformation, where said abstract design patterns provide logical constraints on derivations of said plurality of implementations rather than physical or structural representations of design features or abstractions thereof within said plurality of implementations;

where said non-local constraints are expressed as coupled program parts and coupled transformations, where a coupling implies an action linkage between a coupled set of parts such that changes to or actions on one element of said coupled set trigger compensating changes to or actions on other elements of said coupled set, and where a coupling implies an additional linkage between a plurality of coupled program parts and an abstract design pattern that represents a coordinated refinement goal of said coupled program parts and that provides a pattern of name-based connections, semantically-based connections and pattern-driven connections to relate various elements of separated contexts;

comprising:

specifying implicit design features to be incorporated into a concrete implementation of said abstract design patterns, where a concrete realization of said implicit design features may be implied rather than expressed as programming language forms or abstractions thereof and where said implicit design features are provisional in that said implicit design features are open to further refinement and variation based on concrete details that are subsequently derived or generated, providing a transformation, i.e., derivation, of a concrete implementation from abstract design patterns, including generator transformations that mediate an outcome, and using said abstract design patterns by generator actions that trigger said transformation, i.e., derivation, of a concrete implementation from abstract design patterns;

recognizing coupled parts;

determining a reformation objective of said coupled parts;

decomposing an expression containing said coupled parts into said constituent subparts and determining roles of said constituent subparts; and reformulating said coupled parts according to said reformation objective while making, triggering or scheduling compensating changes required by said non-local constraints.

8. A method of claim 7 for creating and utilizing a specialized version of an abstract design pattern that inherits common elements from a plurality of precursor abstract design patterns, where said specialized version reflects revisions, changes and refinements to a design implied by said plurality of precursor abstract design patterns;

comprising:

creating said specialized version from said plurality of precursor abstract design patterns by using or refining elements and behaviors from said plurality of precursor abstract design patterns to create said specialized version; and utilizing common elements inherited from said plurality of precursor abstract design patterns.

9. A method of claim 7 for creating and utilizing generative behaviors associated with abstract design patterns, where said behaviors include but are not limited to conventional object oriented method functions, a plurality of kinds of transformations, a plurality of higher order transformations that operate on lower order transformations, a plurality of kinds of method transformations, and a plurality of generative functions associated with an abstract design pattern.

10. A method of claim 7 for supplying building blocks for higher order transforms;

comprising:

defining a vocabulary of pairs of role names and corresponding patterns that represent and recognize instances of roles within generator transformations, where roles serve as elements of higher order transforms that operate on and manipulate lower order transforms, where roles are semantic designators of elements within lower order transforms thereby referencing said elements within lower order transforms by semantic properties and relationships of said elements within lower order transforms rather than by syntactic or structural properties of said elements within lower order transforms, where said lower order transforms manipulate and generate elements of a target implementation, where said lower order transforms include but are not limited to method-transforms and other intermediate language stand-in forms, and where said higher order transforms provide a mechanism whereby method-transforms and other intermediate language stand-in forms can be reformed and redefined to incorporate design features that are desired or required within a target implementation; and utilizing said pairs to reformulate and redefine lower order generator transformations to incorporate design features.

11. A method of claim 7 for recognizing an expression that is a concrete instance of an abstract design pattern within a computation specification, where recognition includes but is not limited to pattern matching.

12. A method of claim 7 for identifying intermediate language elements that are used during implementation of said concrete implementation of said abstract design pattern, where said method includes but is not limited to transformations, method transformations, method like transforms, macros, event triggered functions and a plurality of other general programming language constructs, and where said intermediate language elements allow automated modification to adapt said intermediate language elements to a context of usage for said intermediate language elements and make said intermediate language elements subject to constraints and requirements specific to a computation being converted into an implementation.

13. A method of claim 7 for extending an abstract design pattern to introduce variations or extended processing in a design of code refined from said abstract design pattern;

comprising:

defining new or varied elements within specializations of said abstract design pattern, where said new or varied elements will cause said abstract design pattern to refine to new or varied control or data structures and new or varied computational behaviors in general programming language code produced by a generator from an instance of an extended abstract design pattern; and defining new generative behaviors for said specializations of said abstract design pattern, where said new generative behaviors are active elements that will produce said new or varied control or data structures in refined code derived from an instance of an extended abstract design pattern.

14. A method of claim 7 for creating and utilizing implied, provisional implementation architectures, where said architectures include general programming language constructs;

comprising:

evolving implied provisional architectures.

15. A method of claim 7 for creating abstract design patterns that partially and provisionally constrain only a particular set of design features and are agnostic to other design features that may ultimately be incorporated within a context of said abstract design patterns;

comprising:

representing a plurality of coordinated abstractions of programming elements that incorporate said particular set of design features;

representing and using portions of said plurality of coordinated abstractions that are stand-ins for elements or design features that are external to and are undetermined by said plurality of coordinated abstractions; and incorporating external elements or design features into said plurality of coordinated abstractions such that said external elements or design features are consistent with said plurality of coordinated abstractions.

16. A method to use domain specific knowledge to schedule the execution of a dynamically generated transformation the method utilizing separated entities that are coupled by non-localized constraints, decomposing said separated entities into constituent subparts and reformulating said entities to incorporate a design feature such that said separated entities after reformation achieve a computational outcome that is equivalent to that achieved by said separated entities before reformation;

where said dynamically generated transformation is a transformation that is created at generator run time;

where said non-localized constraints are expressed as coupled program parts and coupled transformations, where a coupling implies an action linkage between a coupled set of parts such that changes to or actions on one element of said coupled set trigger compensating changes to or actions on other elements of said coupled set, and where a coupling implies an additional linkage between a plurality of coupled program parts and an abstract design pattern that represents a coordinated refinement goal of said coupled program parts and that provides a pattern of name-based connections, semantically-based connections and pattern-driven connections to relate various elements of separated contexts;

comprising:

using domain specific knowledge to identify an existing transformation;

revising said existing transformation to cause said dynamically generated transformation to be executed when said existing transformation executes;

recognizing coupled parts;

determining a reformation objective of said coupled parts;

decomposing an expression containing said coupled parts into said constituent subparts and determining roles of said constituent subparts; and reformulating said coupled parts according to said reformation objective while making, triggering or scheduling compensating changes required by said non-localized constraints.

* * * * *